United States Patent [19]
Kobayashi et al.

[11] Patent Number: 5,683,824
[45] Date of Patent: Nov. 4, 1997

[54] COATED CERAMIC MEMBER AND PROCESS FOR PRODUCTION THEREOF

[75] Inventors: Hiromichi Kobayashi, Yokkaichi; Tomonori Takahashi, Chita; Yutaka Furuse, Tokyo; Yoshiaki Matsushita, Kawasaki, all of Japan

[73] Assignee: NGK Insulators, Ltd., Nagoya, Japan

[21] Appl. No.: 522,724

[22] Filed: Sep. 1, 1995

[30] Foreign Application Priority Data

Sep. 5, 1994 [JP] Japan .................. 6-210990

[51] Int. Cl.$^6$ .................................. C04B 41/87
[52] U.S. Cl. .................... 428/698; 428/697; 428/699; 428/701; 428/702
[58] Field of Search ...................... 428/698, 701, 428/702, 697, 699

[56] References Cited

U.S. PATENT DOCUMENTS

| | | | |
|---|---|---|---|
| 3,911,188 | 10/1975 | Torti, Jr. et al. | 428/698 |
| 4,187,344 | 2/1980 | Fredriksson | 428/446 |
| 4,301,132 | 11/1981 | Kennedy | 501/90 |
| 4,435,480 | 3/1984 | Mizuhara | 428/698 |
| 4,619,798 | 10/1986 | Tanaka et al. | 264/62 |
| 4,871,587 | 10/1989 | Levin | 427/249 |

FOREIGN PATENT DOCUMENTS

| | | |
|---|---|---|
| 62-72582 A | 4/1987 | Japan . |
| 5-238859 A | 9/1993 | Japan . |

*Primary Examiner*—Archene Turner
*Attorney, Agent, or Firm*—Kubovcik & Kubovcik

[57] ABSTRACT

A coated ceramic member includes a silicon nitride- or silicon carbide-based ceramic base material, a silicon nitride or silicon carbide film formed on the base material by CVD, and an oxide film formed on the film of CVD, and a process for producing the ceramic-coated member. This coated ceramic member maintains excellent durability under severe conditions, for example, in a high-speed combustion gas.

2 Claims, No Drawings

COATED CERAMIC MEMBER AND PROCESS FOR PRODUCTION THEREOF

BACKGROUND OF THE INVENTION (1) Field of the Invention

The present invention relates to a coated ceramic member having excellent heat resistance, thermal shock resistance and corrosion resistance, as well as to a process for production of said member. More particularly, the present invention relates to a coated ceramic member having excellent durability under severe conditions, for example, in a high-speed combustion gas, as well as to a process for production of said member.

(2) Prior Art

As the high-temperature structural material used at high temperatures under severe conditions, ceramic materials such as silicon nitride, silicon carbide and the like have hitherto been known. As the ceramic material of good heat resistance, there is known, for example, a sintered silicon nitride member having a zirconia coating film formed thereon, disclosed in Japanese Patent Application Kokai (Laid-Open) No. 72582/1987.

Such silicon nitride or silicon carbide is a high-temperature-resistant material; however, it often thins owing to the high-temperature oxidation, high-temperature corrosion, etc. Hence, with respect to the member which is exposed to a high-speed combustion gas, there is an important task of improved oxidation resistance for improved durability.

In order to satisfy this task, there was proposed a method of forming an oxide ceramic film on the surface of a base material. In the thus-obtained member comprising a base material and an oxide ceramic film simply formed thereon, when the member is used at high temperatures for a long period of time, the difference in thermal expansion coefficient between the base material and the oxide ceramic film invites a very large stress-induced strain at their boundary, allowing the oxide film to peel from the base material easily.

In order to solve this problem, the present applicant proposed, in Japanese Patent Application Kokai (Laid-Open) Bo. 238859/1993, a coated ceramic member comprising a base material and an oxide film formed thereon, wherein the oxide film consisted of an underlayer, an intermediate layer and a surface layer all formed by plasma spraying and wherein the thermal expansion coefficients of the three layers were made larger in the order of the underlayer, the intermediate layer and the surface layer.

The present applicant made further study and found out the following. The oxide film formed by plasma spraying was not sufficiently dense, inviting the oxidation of the base material; as a result, an oxidized layer generates between the base material and the underlayer, reducing the adhesivity between them and allowing the member to have inferior durability.

SUMMARY OF THE INVENTION

The objects of the present invention are to provide a coated ceramic member comprising a base material and a coating film formed thereon, which has improved adhesion between the base material and the coating film, which has excellent heat resistance, thermal shock resistance and corrosion resistance, and which has excellent durability under severe conditions, for example, in a high-speed combustion gas.

According to the present invention there is provided a coated ceramic member comprising:

a silicon nitride- or silicon carbide-based ceramic base material, a silicon nitride or silicon carbide film formed on the base material by CVD (Chemical Vapor Deposition), and an oxide film formed on said film of CVD.

Preferably, in the coated ceramic member, the oxide film formed on the CVD film comprises an underlayer made of zircon or mullite, formed by a chemical reaction and a surface layer made of zirconia or alumina.

According to the present invention there is also provided a process for producing a coated ceramic member, which comprises forming a silicon nitride or silicon carbide film by CVD on the surface of a silicon nitride- or silicon carbide-based ceramic base material, and then forming an oxide film on said film of CVD.

Preferably, in the above process, the oxide film is formed in at least two layers of an underlayer and a surface layer and the underlayer is formed by a chemical reaction. Preferably, the chemical reaction comprises conducting a temperature elevation at a rate of 500° C./hr or less and then conducting a heat treatment in the atmosphere at a temperature of 1,450° C. or more for 10 hours or more.

Preferably, the oxide film is formed so as to give a film thickness of 10–35 μm per one coating.

DETAILED DESCRIPTION OF THE INVENTION

The coated ceramic member of the present invention includes:

a silicon nitride- or silicon carbide-based ceramic base material, a silicon nitride or silicon carbide film formed on the base material by CVD, and an oxide film formed on said film of CVD.

Therefore, the adhesion strength between the base material and the films formed thereon is large, whereby the present coated ceramic member has excellent durability even under severe conditions, for example, in a high-speed combustion gas.

Preferably, the oxide film formed on the CVD film comprises at least two layers of an underlayer and a surface layer. Preferably, the underlayer is formed by a chemical reaction which comprises coating an oxide on the CVD film by paste coating or the like and then heat-treating the coated oxide in the atmosphere, because this reaction gives a high adhesion strength between the base material and the films formed thereon. With this chemical reaction, a chemical reaction layer is formed on the CVD film and becomes an underlayer. On the underlayer a surface layer or an intermediate layer is formed (both layers are each an oxide layer). In this case, the chemical reaction layer is formed by a mutual diffusion reaction with both the oxide layer and the CVD film and consequently has excellent adhesivity with the base material.

In the present invention, there is no restriction as to the kind of the material for the oxide film formed on the CVD film, as long as said material is a ceramic. However, the material for oxide film is preferably zirconia or alumina. When the material for the oxide film to be formed on the CVD film made from silicon nitride or silicon carbide is zirconia or alumina, the chemical reaction (the heat-treatment in the atmosphere) gives rise to formation of a zircon or mullite layer at the boundary between the CVD film and the oxide film. This zircon or mullite layer becomes an underlayer of the oxide film and shows a very large adhesion strength to the base material.

Desirably, the chemical reaction is conducted by conducting a heat-treatment in the atmosphere at a temperature of 1,450° C. or more, preferably at 1,450°–1500° C. for 10 hours or more, preferably 10–100 hours. The rate of the temperature elevation applied prior to the chemical reaction is preferably 500° C./hr or less. When the temperature elevation rate exceeds 500° C./hr, there occurs rapid firing contraction of the coating film, resulting in uneven contraction. This invites cracking of film or peeling of film from base material. Thus, no sufficient adhesion strength is obtained. When the thickness of coating film is large, it is necessary to lower the temperature elevation rate at the temperature when the firing contraction begins, i.e., 1,100° C. in the case of zirconia and 1,300° C. in the case of alumina. This small temperature elevation rate can prevent sudden firing contraction. However, too small a temperature elevation rate had better be avoided in view of the productivity.

The oxide film formed on the CVD film comprises at least two layers of an underlayer and a surface layer, but preferably comprises three layers of an underlayer, an intermediate layer and a surface layer. Preferably, the surface layer is formed in a thin film by plasma spraying and subsequent heat-treatment in the atmosphere, because it gives high adhesion and durability.

The formation of the CVD film on the ceramic base material is generally conducted as follows.

A silicon nitride- or silicon carbide-based base material is placed in a reaction furnace and a film is formed on the base material under the following conditions.

|  | SiC | $Si_3N_4$ |
|---|---|---|
| Film formation temperature (°C.) | 1300 | 1450 |
| Total gas pressure (Torr) | 50 | 50 |
| Gas flow rate (cm³/min) |  |  |
| $SiCl_4$ | 1000 | 200 |
| $NH_3$ | — | 500 |
| $CH_4$ | 1000 | — |
| $H_2$ | 6000 | 4500 |
| Film formation rate (μm/hr) | 50 | 100 |

In the present invention, the thickness of oxide film formed per one coating on the CVD film is important. The thickness is preferably 10–35 μm. When the thickness exceeds 35 μm, the formed oxide film tends to give defects such as cracking when it is subjected to the heat treatment. When the thickness is less than 10 μm, no sufficient film thickness may be obtained after the heat treatment. Coating of an oxide is made at least once. When the coating is made a plurality of times, the treatment (e.g. chemical reaction) after coating is repeated a plurality of times.

The total thickness of the oxide film after the heat treatment is preferably 10–70 μm, more preferably 20–50 μm. When the total oxide film thickness is exceeds 70 μm, film peeling takes place easily. When the total oxide film thickness is less than 10 μm, the resulting coated ceramic member lacks sufficient oxidation resistance or corrosion resistance.

The present invention is hereinafter described in more detail by way of Examples. The present invention, however, is not restricted to these Examples.

EXAMPLES 1–8 and Comparative Examples 1–6

On a silicon nitride base material was formed a film by CVD under the following conditions.

| Film formation temperature | 1450° C. |
|---|---|
| Total gas pressure | 50 Torr |
| Gas flow rate |  |
| $SiCl_4$ | 200 cm³/min |
| $NH_3$ | 500 cm³/min |
| $H_2$ | 4500 cm³/min |
| Film formation rate | 100 μm/hr |

On the CVD film a zirconia ($ZrO_2$) paste or an alumina paste was coated (the compositions of these pastes are shown in Table 1) by screen printing, followed by heat treatment in the atmosphere under the conditions shown in Table 1. Each of the resulting oxide films was measured for the amount of zircon or mullite produced, adhesion strength and surface condition, which are shown in Table 1. Incidentally, 0Y, 3Y or 8Y in Table 1 indicates that 0, 3 or 8 mole % of $Y_2O_3$ is contained in $ZrO_2$.

TABLE 1

|  | Paste composition | Thickness of film formed per one coating (μm) | Temperature elevation rate (°C./hr) | Temperature of heat treatment (°C.) | Time of heat treatment (hr) | Amount of zircon produced | Adhesion strength (MPa) | Surface condition |
|---|---|---|---|---|---|---|---|---|
| Example 1 | 0Y$ZrO_2$ | 20 | 400 | 1450 | 100 | 0.95 | 100 ± 15 | ○ Good |
| 2 | 3Y$ZrO_2$ | 20 | 150 | 1450 | 100 | 0.95 | 100 ± 10 | ○ Good |
| 3 | 8Y$ZrO_2$ | 30 | 50 | 1500 | 50 | 0.95 | 120 ± 20 | ○ Good |
| 4 | 8Y$ZrO_2$ | 20 | 50 | 1500 | 10 | 0.90 | 120 ± 25 | ○ Good |
| 5 | 8Y$ZrO_2$ | 10 | 150 | 1450 | 70 | 0.95 | 100 ± 10 | ○ Good |
| Comparative 1 | 0Y$ZrO_2$ | 20 | 400 | 1400 | 100 | 0.40 | 40 ± 15 | ○ Good |
| Example 2 | 3Y$ZrO_2$ | 20 | 1000 | 1450 | 100 | 0.40 | — | X Cracking |
| 3 | 8Y$ZrO_2$ | 40 | 50 | 1500 | 50 | 0.95 | — | X Cracking |
|  |  |  |  |  |  | Amount of mullite produced |  |  |
| Example 6 | $Al_2O_3$ | 10 | 400 | 1450 | 100 | 0.60 | 100 ± 15 | ○ Good |
| 7 | $Al_2O_3$ | 20 | 150 | 1450 | 100 | 0.60 | 100 ± 10 | ○ Good |
| 8 | $Al_2O_3$ | 30 | 50 | 1500 | 50 | 0.65 | 110 ± 20 | ○ Good |
| Comparative 4 | $Al_2O_3$ | 20 | 400 | 1400 | 100 | 0.30 | 45 ± 15 | ○ Good |
| Example 5 | $Al_2O_3$ | 20 | 1000 | 1450 | 100 | 0.50 | — | X Cracking |
| 6 | $Al_2O_3$ | 40 | 50 | 1500 | 50 | 0.65 | — | X Cracking |

In Table 1, the amount of zircon produced was qualitatively determined using the peak heights of the following crystal phases based on the results of X-ray diffractometry. The amount of zircon produced was determined as (zircon)/(zircon+m-$ZrO_2$+t-$ZO_2$), by using peak heights at $2\theta=27.0$ (zircon phase), $2\theta=28.2$ (m-$ZrO_2$, monoclinic zirconia) and $2\theta=30.3$ (t-$ZrO_2$, tetragonal zirconia).

Meanwhile, the amount of mullite produced was determined as follows. The amount of mullite produced was determined as (mullite)/(mullite+$\alpha$-$Al_2O_3$), by using peak heights at $2\theta=26.3$ (mullite phase) and $2\theta=43.3$ ($\alpha$-$Al_2O_3$ phase).

The adhesion strength of an oxide film was measured by an adhesion method using an epoxy type adhesive. A silicon nitride-made rod having a 4 mm×4 mm cross-section was vertically adhered onto the surface of an oxide film, with an epoxy type adhesive. A load was applied to the rod at the point 15 mm distant from the rod-film boundary, by the use of an autograph; and the applied force when the rod fell down, was recorded and taken as the adhesion strength of the oxide film.

Each of the oxide films having excellent adhesion strengths, formed in Examples 1–8 was further subjected to a static oxidation test of keeping each film at 1,400° C. for 100 hours in the atmosphere. All the films showed no reduction in adhesion strength, in the test.

EXAMPLES 9–10 and Comparative Examples 7–11

On a base material shown in Table 2 was coated a zirconia ($ZrO_2$) or alumina paste by screen printing, followed by heat treatment in the atmosphere at 1,500° C. for 50 hours, to form an underlayer and an intermediate layer. Then, coating by plasma spraying was conducted, followed by heat treatment in the atmosphere at 1,400° C. for 10 hours, to form a surface layer.

Each of the thus-obtained samples was exposed to a high-speed combustion gas stream of 1,400° C., 8.5 atm and 300 m/sec for 10 hours to examine the durability (peeling or no peeling) and adhesion strength after exposure, of the oxide film of each sample.

The results are shown in Table 2.

TABLE 2

|  | Base material | CVD film | Material of CVD film | Under layer | Intermediate layer | Surface layer | Durability | Adhesion strength after test (MPa) |
| --- | --- | --- | --- | --- | --- | --- | --- | --- |
| Example 9 | Silicon nitride | Formed | Silicon nitride | CR zircon | CR zirconia | PS zirconia | No peeling | 90 ± 10 |
| 10 | Silicon carbide | Formed | Silicon carbide | CR mullite | CR alumina | PS alumina | No peeling | 90 ± 10 |
| Comparative 7 | Silicon nitride | Not formed | — | PS zircon | zircon/zirconia | zirconia | Peeled |  |
| Example 8 | Silicon nitride | Not formed | — | CR zircon | CR zirconia | PS zirconia | Peeled |  |
| 9 | Silicon nitride | Not formed | — | CR zirscon | Cr zironcia | — | Peeled |  |
| 10 | Silicon carbide | Not formed | — | PS mullite | Mullite/Alumina | Alumina | Peeled |  |
| 11 | Silicon carbide | Not formed | — | CR mullite | CR alumina | PS alumina | Peeled |  |

CR: Chemical reaction
PS: Plasma spraying

As is clear from Table 2, the samples of the present invention comprising a base material, a CVD film formed thereon and an oxide film (an underlayer, an intermediate layer and a surface layer) formed on the CVD film show excellent durability even under severe conditions, for example, in a high-speed combustion gas.

What is claimed is:

1. A coated ceramic member comprising:

a silicon nitride- or silicon carbide-based ceramic base material, a silicon nitride or silicon carbide film formed on the base material by CVD, and an oxide film formed on said film of CVD.

2. A coated ceramic member according to claim 1, wherein the oxide film comprises an under layer made of zircon or mullite, formed by a chemical reaction and a surface face layer made from zirconia or alumina.

* * * * *